US009734714B1

United States Patent
Fan et al.

(10) Patent No.: US 9,734,714 B1
(45) Date of Patent: Aug. 15, 2017

(54) FINE GRAINED LOCATION-BASED SERVICES

(71) Applicant: International Business Machines Corporation, Armonk, NY (US)

(72) Inventors: Si Bin Fan, Beijing (CN); Yu Gu, Cedar Park, TX (US); Su Liu, Austin, TX (US); Cheng Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/166,814

(22) Filed: May 27, 2016

(51) Int. Cl.
| | | |
|---|---|---|
| *B60Q 1/00* | (2006.01) | |
| *G08G 1/16* | (2006.01) | |
| *H04W 4/02* | (2009.01) | |
| *H04W 4/04* | (2009.01) | |

(52) U.S. Cl.
CPC .............. *G08G 1/161* (2013.01); *H04W 4/02* (2013.01); *H04W 4/046* (2013.01)

(58) Field of Classification Search
CPC .. G08G 1/161; G08G 1/096791; G08G 1/163; G08G 1/166; H04W 4/046
USPC ........................................................ 340/435
See application file for complete search history.

(56) References Cited

U.S. PATENT DOCUMENTS

| | | | | |
|---|---|---|---|---|
| 4,807,127 A | * | 2/1989 | Tenmoku | G01C 21/30 340/988 |
| 4,962,457 A | * | 10/1990 | Chen | G08G 1/096716 340/905 |
| 5,872,526 A | | 2/1999 | Tognazzini | |
| 5,900,825 A | * | 5/1999 | Pressel | G01C 21/3629 340/905 |
| 6,098,048 A | * | 8/2000 | Dashefsky | G06Q 30/02 340/438 |
| 6,487,500 B2 | | 11/2002 | Lemelson et al. | |
| 8,161,172 B2 | | 4/2012 | Reisman | |
| 8,681,741 B1 | | 3/2014 | Ngo et al. | |
| 8,884,782 B2 | * | 11/2014 | Rubin | G08G 1/161 340/435 |
| 8,935,094 B2 | * | 1/2015 | Rubin | H04W 4/046 701/517 |
| 2009/0079622 A1 | | 3/2009 | Seshadri et al. | |

(Continued)

FOREIGN PATENT DOCUMENTS

WO    2009070430 A2    6/2009

OTHER PUBLICATIONS

Toledo-Moreo et al., "IMM-based lane-change prediction in highways with low-cost GPS/INS." Intelligent Transportation Systems, IEEE Transactions on 10.1 (2009), pp. 180-185.

(Continued)

*Primary Examiner* — John A Tweel, Jr.
(74) *Attorney, Agent, or Firm* — Patterson + Sheridan, LLP

(57) ABSTRACT

Systems, methods, and computer program products to perform an operation comprising receiving, by a first communications interface of a mobile device associated with a first vehicle, location information from a peer device associated with a second vehicle, determining, by the mobile device, an estimated location of the second vehicle relative to the first vehicle based on the location information received from the peer device, and determining, by the mobile device, that the first vehicle is located in a first lane of a road based on the estimated location of the second vehicle relative to the first vehicle.

13 Claims, 8 Drawing Sheets

(56) References Cited

U.S. PATENT DOCUMENTS

| | | |
|---|---|---|
| 2009/0252200 A1 | 10/2009 | Dohler et al. |
| 2010/0069035 A1 | 3/2010 | Johnson |
| 2011/0167390 A1 | 7/2011 | Reed, Jr. et al. |
| 2014/0129075 A1 | 5/2014 | Carleton |

OTHER PUBLICATIONS

Chen et al., "Ad hoc peer-to-peer network architecture for vehicle safety communications." Communications Magazine, IEEE 43.4 (2005), pp. 100-107.
Sengupta et al. "Cooperative collision warning systems: concept definition and experimental implementation." Journal of Intelligent Transportation Systems 11.3 (2007), pp. 143-155.
Naranjo et al. "Lane-change fuzzy control in autonomous vehicles for the overtaking maneuver." Intelligent Transportation Systems, IEEE Transactions on 9.3 (2008), pp. 438-450.
Kato et al. "Vehicle control algorithms for cooperative driving with automated vehicles and inter-vehicle communications." Intelligent Transportation Systems, IEEE Transactions on Intelligent Transportation Systems, vol. 3, No. 3 (2002), pp. 155-161.
USFWS/ERDC NRDA Bird Database, "Data Entry Instructions: Transferring Data from GPS Units to the ERDC Database", Retrieved from <http://training.fws.gov/courses/roadmaps/oil-spill/training/nrdar/data_management/gps_data_transfer_and_upload_instructions_28Jun10.pdf> on May 27, 2016. 8 pages.

\* cited by examiner

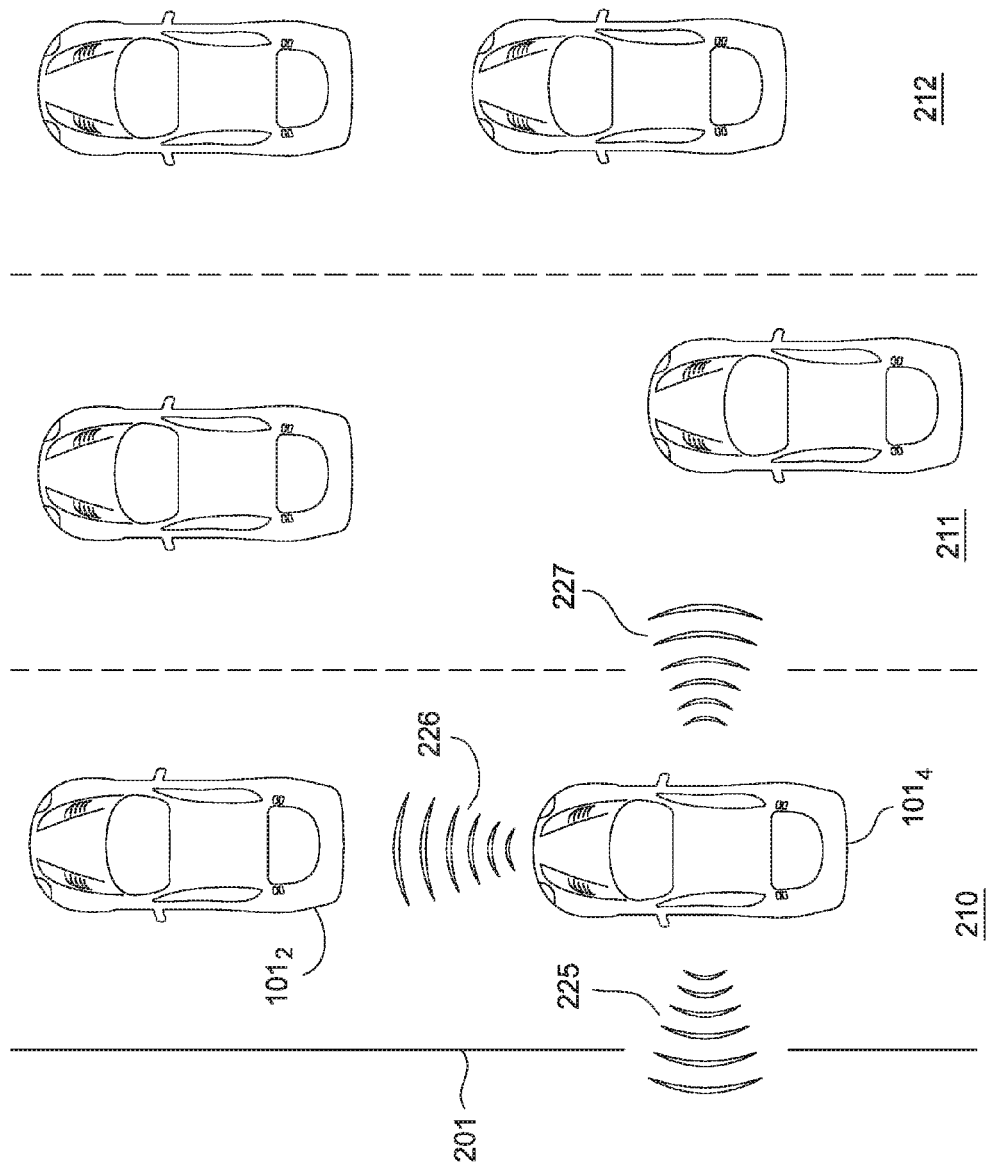

FINE GRAINED LOCATION-BASED SERVICES

BACKGROUND

The present invention relates to location-based services, and more specifically, to providing fine grained location-based services.

Location-based services, such as navigation systems, may use global positioning system (GPS) modules to determine the location (or position) of a vehicle, mobile device, and the like. However, most GPS modules can only achieve 5-10 meters of accuracy. Using such coarse precision, many location-based services suffer as a consequence. For example, a smartphone-based navigation application is unable to tell which lane of a highway the user's car is traveling on. To acquire greater precision, significantly more expensive GPS modules are needed. However, the cost of these solutions makes them impractical for consumer applications. Therefore, there is a need to provide more accurate location estimates without requiring costly dedicated hardware.

SUMMARY

According to one embodiment, a method comprises receiving, by a first communications interface of a mobile device associated with a first vehicle, location information from a peer device associated with a second vehicle, determining, by the mobile device, an estimated location of the second vehicle relative to the first vehicle based on the location information received from the peer device, and determining, by the mobile device, that the first vehicle is located in a first lane of a road based on the estimated location of the second vehicle relative to the first vehicle.

According to another embodiment, a system comprises one or more computer processors, and a memory containing a program which when executed by the processors performs an operation comprising receiving, by a first communications interface of a mobile device associated with a first vehicle, location information from a peer device associated with a second vehicle, determining, by the mobile device, an estimated location of the second vehicle relative to the first vehicle based on the location information received from the peer device, and determining, by the mobile device, that the first vehicle is located in a first lane of a road based on the estimated location of the second vehicle relative to the first vehicle.

According to another embodiment, a computer program product comprises a computer-readable storage medium having computer-readable program code embodied therewith, the computer-readable program code executable by one or more computer processors to perform an operation comprising receiving, by a first communications interface of a mobile device associated with a first vehicle, location information from a peer device associated with a second vehicle, determining, by the mobile device, an estimated location of the second vehicle relative to the first vehicle based on the location information received from the peer device, and determining, by the mobile device, that the first vehicle is located in a first lane of a road based on the estimated location of the second vehicle relative to the first vehicle.

BRIEF DESCRIPTION OF THE SEVERAL VIEWS OF THE DRAWINGS

FIGS. 2A-2C illustrate examples of determining fine grained locations, according to various embodiments.

DETAILED DESCRIPTION

Embodiments disclosed herein provide precise estimates of location data without requiring expensive dedicated hardware. The disclosure provides mobile devices, vehicles, and other systems which communicate with each other the means to determine a more precise location estimate than the coarse estimates provided by commercial-grade systems (such as smartphone or vehicle GPS-based systems). Generally, embodiments disclosed herein leverage short-range communication interfaces (such as WiFi, near field communication (NFC), Bluetooth®, acoustic signals, and the like) to determine relative position between vehicles (and/or mobile devices). Doing so allows the systems to determine a more precise location estimate, such as which lane of a road the vehicle is known to be travelling on. Furthermore, the mobile devices and vehicles disclosed herein may also communicate with nearby infrastructure (such as public WiFi, cellular towers, automatic toll stations, intersection cameras, and the like) to enhance the location estimates. The enhanced location estimates may then be provided to location-based services, such as lane-based navigation systems, collision avoidance systems, driver assistance systems, blind spot warning systems, and the like, all of which conventionally require dedicated and specialized hardware.

Figure 1:
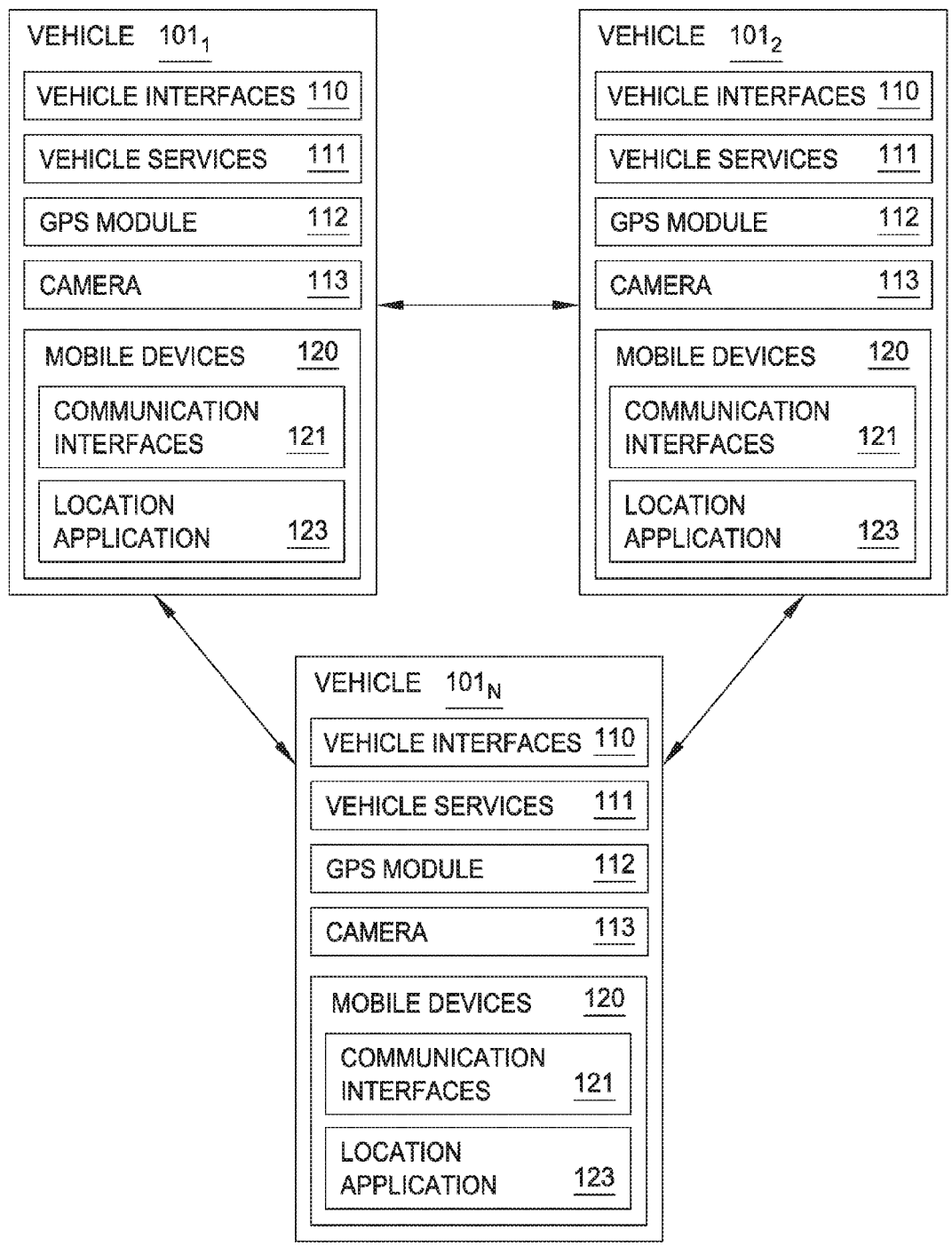
FIG. 1 is a schematic illustrating a system which provides fine grained location services, according to one embodiment.

FIG. 1 is a schematic illustrating a system 100 which provides fine grained location services, according to one embodiment. As shown, the system 100 includes three example vehicles $101_1$, $101_2$, and $101_N$. While only three vehicles are shown, any number of vehicles may be included in the system 100. Generally, the vehicles $101_{1-N}$ (and/or mobile devices 120 present therein) may communicate with each other to determine more precise location estimates. As shown, the vehicles $101_{1-N}$ include one or more vehicle interfaces 110, vehicle services 111, a GPS module 112, and a camera 113. The vehicle interfaces 110 include any type of communication interfaces, such as WLAN interfaces, cellular data radios, Bluetooth® modules, speakers, NFC devices, radar, Dedicated Short Range Communications (DSRC), and the like. The vehicle services 111 include software, hardware, and a combination of both. Example vehicle services include navigation systems, collision avoidance systems, parking assistance systems, driver assistance systems, blind spot warning systems, and the like. The GPS module 112 is configured to provide GPS location data reflecting an estimate of the vehicle's current position. The camera 113 is generally configured to capture image data of the surroundings of the vehicle.

As shown, one or more mobile devices 120 may be associated with each vehicle $101_{1-N}$. The mobile devices 120 may be carried by people in each vehicle. Examples of mobile devices include smartphones, tablets, portable gaming devices, laptops, and the like. As shown, the mobile devices 121 include communication interfaces 120 and a location application 123. The communication interfaces 121 include any type of communications interface, such as WLAN interfaces, cellular data radios, DSRC, Bluetooth® modules, speakers, NFC modules, and the like. The location application 123 is configured to provide precise location estimates by orchestrating communication with nearby vehicles or public infrastructure (not pictured) to determine relative positions. The location application 123 may cause the communication interfaces 121 (or vehicle interfaces 110) to emit a request (or other type of signal) to other nearby vehicles $101_{1-N}$ or public infrastructure. The request may specify to provide location information, such as a response that another vehicle is present. The vehicle interfaces 110 of the vehicles $101_{1-N}$ or the communication interfaces 121 of the mobile devices 120 may respond to the request, indicating their presence. The responses may include location information of other vehicles or objects known to the responding vehicle $101_{1-N}$ or mobile device 120.

For example, the location application 123 of the mobile device 120 associated with vehicle $101_1$ may identify, using location data from the GPS module 112, a specific road that the vehicle $101_1$ is traveling on. The location application 123 may leverage map information that indicates how many lanes the road has. For example, a map or navigation database may indicate that the road the vehicle $101_1$ is traveling on has 2 lanes in each direction. However, the GPS module 112 may not provide enough precision to allow the location application 123 to determine which lane of the road the vehicle is traveling on. In order to determine which lane the vehicle $101_1$ is traveling on, the location application 123 may cause the communication interfaces 121 and/or vehicle interfaces 110 to emit signals (and/or formatted data requests) targeted to the front, rear, left, and right sides of the vehicle $101_1$. A surrounding vehicle or other infrastructure may then respond to the signal or request. For example, the request emitted to the right of vehicle $101_1$ may be detected by vehicle $101_2$.

The vehicle interfaces 110 of vehicle $101_2$ may then generate a response, which is sent back to the vehicle $101_1$. The communication interfaces 121 of the mobile device 120 in vehicle $101_1$ and/or vehicle interfaces 110 of vehicle $101_1$ may receive the response, and determine that a vehicle is on the right side of vehicle $101_1$. As another example, the vehicle interface 110 of vehicle $101_1$ may emit a proximity signal (e.g., in the form of a radar or ultrasonic signal) to the right side of the vehicle $101_1$. Since the vehicle $101_2$ is to the right of vehicle $101_1$, the proximity signal may bounce off of vehicle $101_2$, and return to vehicle $101_1$, which indicates a vehicle or other object is located to the right of vehicle $101_1$. Similarly, the location application 123 may cause the camera 113 (or a camera of the mobile device 120, not pictured) to capture image data of these locations. The location application 123 may then analyze the image data to detect the presence of vehicle $101_2$ to the right of vehicle $101_1$. Based on the determination that a vehicle is located to the right of vehicle $101_1$, the location application 123 may determine that the vehicle is traveling in the left lane of the 2-lane road. The location application 123 may then provide this precise location information to the vehicle services 111 of the vehicle $101_1$ or other applications providing services on the mobile device 120 in the vehicle $101_1$.

By providing more accurate and more precise location estimates, the performance of the mobile devices 120 is improved. For example, the location application 123 may provide lane-based navigation services, or any other type of service which leverage the more accurate location estimates.

Furthermore, the performance of the GPS module 112 is improved by the improved location estimates. Similarly, the technical field of GPS-based navigation systems is improved without the need of expensive, dedicated hardware.

Figure 2A:
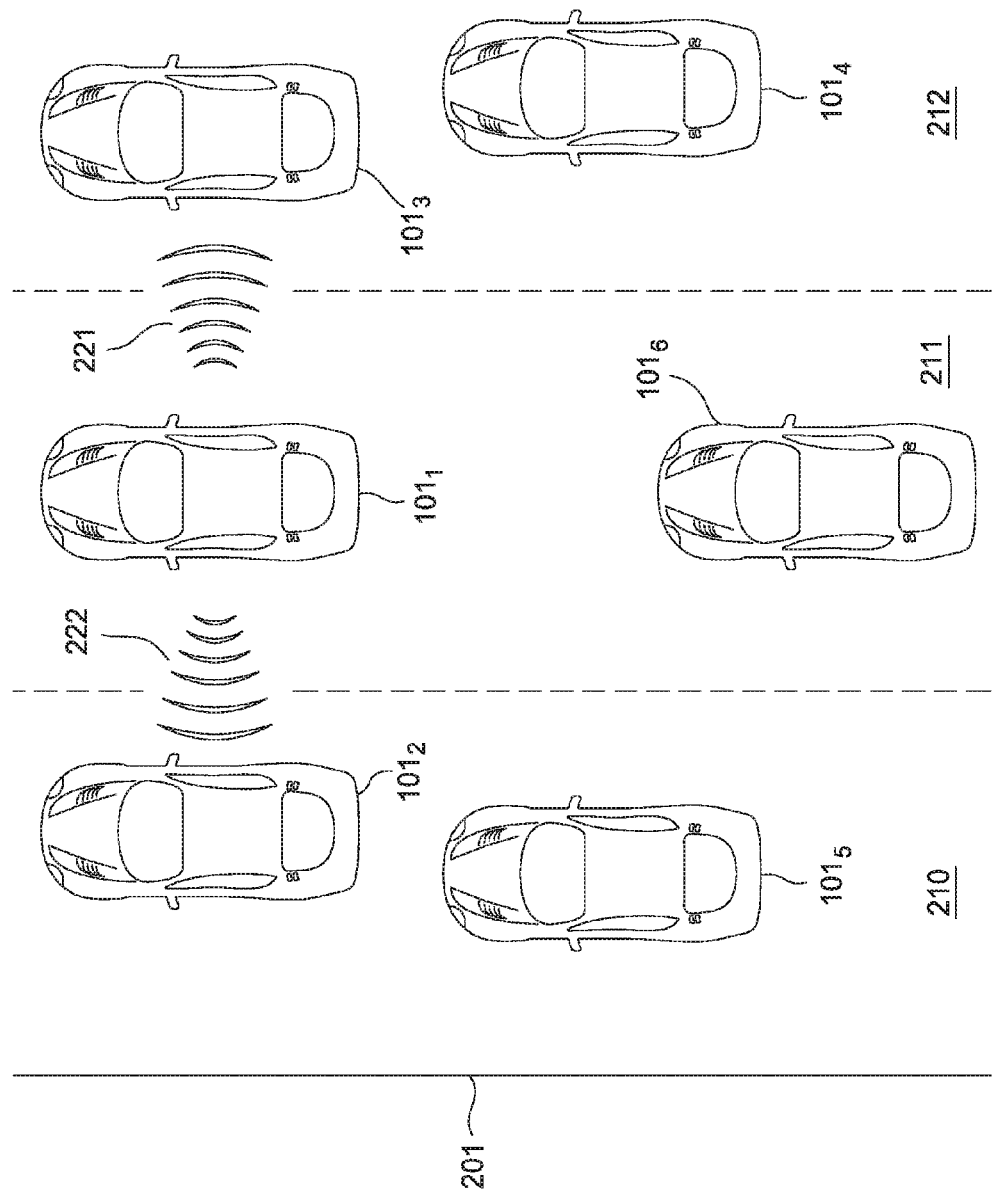

FIG. 2A illustrates an example of determining a fine grained location, according to one embodiment. As shown, FIG. 2A depicts a plurality of vehicles $101_{1-6}$ traveling on a portion of a road 201 which includes three lanes, namely lanes 210-212. As shown, vehicles $101_{2,5}$ are in the leftmost lane 210, vehicles $101_{1,6}$ are in the center lane 211, and vehicles $101_{3,4}$ are in the rightmost lane 212. As shown, vehicle $101_1$ (or a mobile device 120 therein) may emit signals 221, 222 to determine if vehicles or other objects are located nearby. Doing so allows the location application 123 to determine the vehicle's relative position on the road 201, and provide more accurate location information to the vehicle services 111 or other applications on the mobile device 120. For example, the vehicle interfaces 110 (and or communication interfaces 121) may emit targeted DSRC signals 221, 222. The instances of the location application 123 on the mobile devices 120 of vehicles $101_{2,3}$ may receive the signals, and respond with an indication of their presence. The responses may also include information about surrounding vehicles. For example, the vehicle $101_3$ may transmit an indication that vehicle $101_4$ is located behind vehicle $101_3$. The communication interfaces 121 of the mobile device 120 in vehicle $101_1$ and/or vehicle interfaces 110 of vehicle $101_1$ may receive the responses, allowing the location application 123 to determine that vehicles are located on both sides of vehicle $101_1$. Based on the received information, the location application 123 may determine that vehicle $101_1$ is located in lane 211. The location application 123 of the mobile device 120 in the vehicle $101_1$ may then provide the precise location information to the vehicle services 111 and/or other applications executing on the mobile device 120.

Figure 2B:
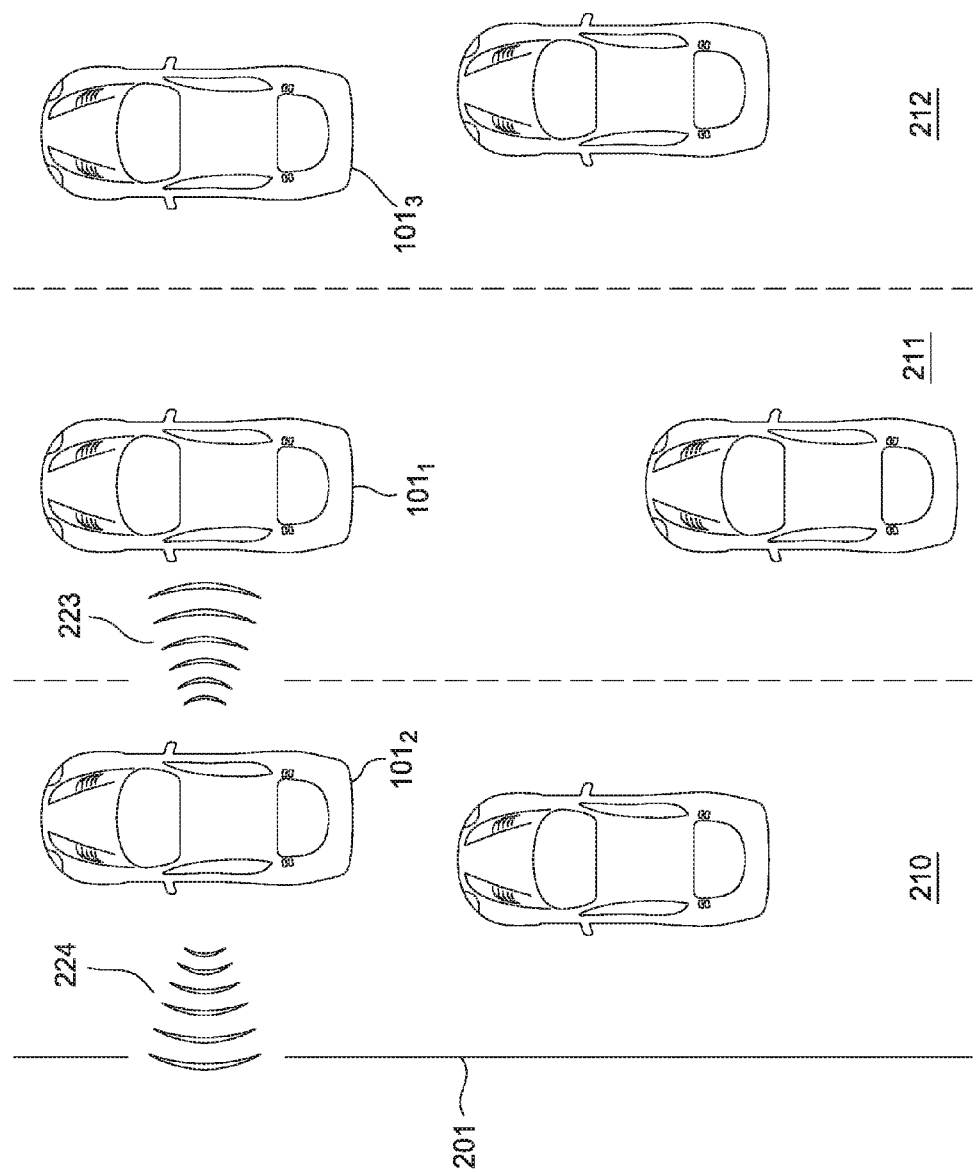

FIG. 2B illustrates another example of determining a fine grained location, according to one embodiment. As shown, FIG. 2B depicts the vehicles $101_{1-6}$ traveling on the road 201. As shown, vehicle $101_2$ (or a mobile device 120 therein) may emit signals 223, 224 to determine if vehicles or other objects are located nearby. For example, the vehicle interfaces 110 (and or communication interfaces 121) of vehicle $101_2$ may emit targeted DSRC signals 223, 224. The instances of the location application 123 on the mobile devices 120 of vehicle $101_1$ may receive the signals, and respond with an indication of its presence. However, because the vehicle $101_2$ is in the leftmost lane 210, a vehicle does not respond to the signal 224. Therefore, the location application 123 may determine that vehicle $101_2$ is located in lane 210. Furthermore, the location application 123 may emit additional signals to determine whether any object (such as a median) is to the left of vehicle $101_2$. A property of a returned signal may indicate that a concrete or steel median is present to the left of the vehicle, allowing the location application 123 to determine that the vehicle $101_2$ is traveling in lane 210. The location application 123 of the mobile device 120 in the vehicle $101_2$ may then provide the precise location information to the vehicle services 111 and/or other applications executing on the mobile device 120.

FIG. 2C illustrates another example of determining a fine grained location, according to one embodiment. As shown, FIG. 2C depicts the vehicles $101_{1-6}$ traveling on the road 201. As shown, vehicle $101_4$ (or a mobile device 120 therein) may emit signals 225-227 to determine if vehicles or other objects are located nearby. For example, the vehicle interfaces 110 (and or communication interfaces 121) of vehicle $101_4$ may emit targeted audio tones as signals 225-227. The instances of the location application 123 on the mobile device 120 in vehicle $101_2$ may receive (or reflect) the signal 226, and respond with an indication of its presence. Based on the response (or the angle of reflection of the audio signal 226), the location application 123 of the mobile device 120 in the vehicle $101_4$ may determine that vehicle $101_2$ is in front of vehicle $101_4$.

As another example, signals 225-227 may be Bluetooth® data transmissions. The mobile device 120 in vehicle $101_2$ may respond to the Bluetooth® signal 226, and provide an indication of its determined lane location (e.g., lane 210). Based on this response, the location application 123 of the mobile device 120 in vehicle $101_4$ may determine that vehicle $101_4$ is also located in lane 210. The location application 123 of the mobile device 120 in vehicle $101_4$ may also make this determination based upon the lack of a response to signals 225, 227 (e.g., within a predetermined period of time).

However, because the vehicle $101_4$ is in the leftmost lane 210, a vehicle does not respond to the signal 225. Therefore, the location application 123 may determine that vehicle $101_4$ is located in lane 210. Furthermore, the location application 123 may emit additional signals to determine whether any object (such as a median) is to the left of vehicle $101_4$. A property of a returned signal may indicate that a concrete or steel median is present to the left of the vehicle, allowing the location application 123 to determine that the vehicle $101_4$ is traveling in lane 210. The location application 123 of the mobile device 120 in the vehicle $101_4$ may then provide the precise location information to the vehicle services 111 and/or other applications executing on the mobile device 120.

As other example embodiments, the location application 123 may leverage object detection technology (not pictured) which allows vehicles to recognize objects, such as solid painted lines on a road, dashed lines on a road, and other vehicles transitioning into an adjacent lane or off of the road. Based on this object detection technology, the location application 123 may further refine the location information for the vehicle. For example, a solid line to the left of a vehicle may indicate that the vehicle is traveling in the leftmost lane of the road. Similarly, a solid line to the right of the vehicle may indicate the vehicle is traveling on the rightmost lane of the road. Further still, dashed lines on both sides of the vehicle may indicate that the vehicle is not on the rightmost or leftmost lanes, but rather is in one of the interior lanes of the road (e.g., lane 211 in FIGS. 2A-2C).

Figure 3:
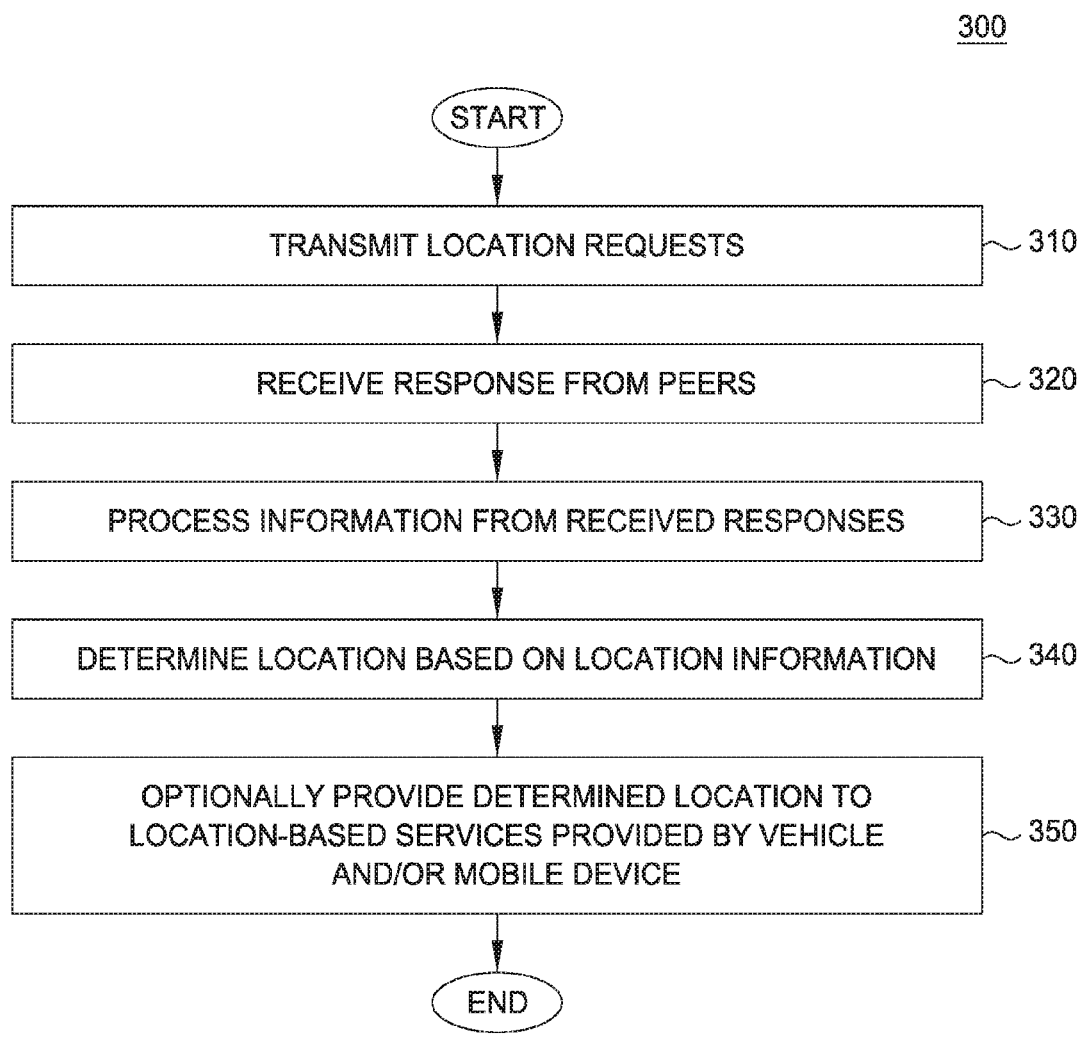
FIG. 3 is a flow chart illustrating a method to provide fine grained location-based services, according to one embodiment.

FIG. 3 is a flow chart illustrating a method 300 to provide fine grained location-based services, according to one embodiment. As shown, the method 300 begins at block 310, where a mobile device 120 (and/or vehicle 101) transmits a location request to one or more peers, such as nearby mobile devices, vehicles, and/or infrastructure (such as toll payment systems, WiFi hotspots, and the like). Generally, the request may be sent via the communication interfaces 121 and/or the vehicle interfaces 110. For example, a mobile device 102 may transmit a location request via a Bluetooth® module of the mobile device 120 to nearby mobile devices. Similarly, the location application 123 of a mobile device 120 may cause a Bluetooth® module of a paired vehicle 101 to generate and send the request via a Bluetooth® vehicle interface 110. As another example, the vehicle interface 110 may emit a radar signal used to communicate with nearby vehicles. In at least one embodiment, the request may include known information location for the mobile device (and/or associated vehicle), such as GPS coordinates.

At block 320, the mobile device 120 and/or the vehicle 101 may receive a response from one or more peers. The response may be generated by the location application 123 and/or a dedicated component of the vehicle or local infrastructure. For example, a mobile device 120 from a different vehicle 101 may respond to the Bluetooth® request sent at block 310. In other embodiments, the response may be a passive response, such as a radar signal (or audio tone) that bounces back to the requesting entity. The response may specify any number of attributes of the associated vehicle, such as GPS coordinates, rate of speed, location information of other vehicles 101, and the like. Similarly, for static infrastructure, the response may include identifying attributes, services provided, location information, and the like. At block 330, the location application 123 may process the information included in the responses received at block 320. For example, the location application 123 may use the directionality or relative location information provided in each response to determine the location of each responding peer relative to the requesting mobile device 120 (and/or associated vehicle 101). Doing so allows the location application 123 to determine the position of the responding peers relative to the corresponding mobile device 120 (and/or vehicle 101). Stated differently, the location application 123 may fuse the relative position information from all nearby vehicles (and/or mobile devices), which the location application 123 may then leverage to infer the absolute position of the vehicle among the responding vehicles and devices.

At block 340, the location application 123 may determine a more precise location based on the processed location information. The more precise location may be determined based on one or more of the responses received from the peer vehicles, available infrastructure, and existing location data (such as known GPS coordinates). For example, the location application 123 may receive information indicating vehicles are to the left, front, and rear of an associated vehicle 101. Furthermore, the location application 123 may determine that a first peer vehicle, which responded from the left to the associated vehicle 101, included location information for a second peer vehicle in its response at block 320. The location information may indicate that the second peer vehicle is to the left of the first peer vehicle. If the vehicles are all traveling on a three-lane road (e.g., based on GPS location data), the location application 123 may leverage the above information to determine that the vehicle 101 associated with the mobile device is in the rightmost lane of the three-lane road. At block 350, the location application 123 may optionally provide the location information determined at block 340 to location-based services provided by the associated mobile device 120 and or the vehicle 101 (e.g., the vehicle services 111).

Figure 4:
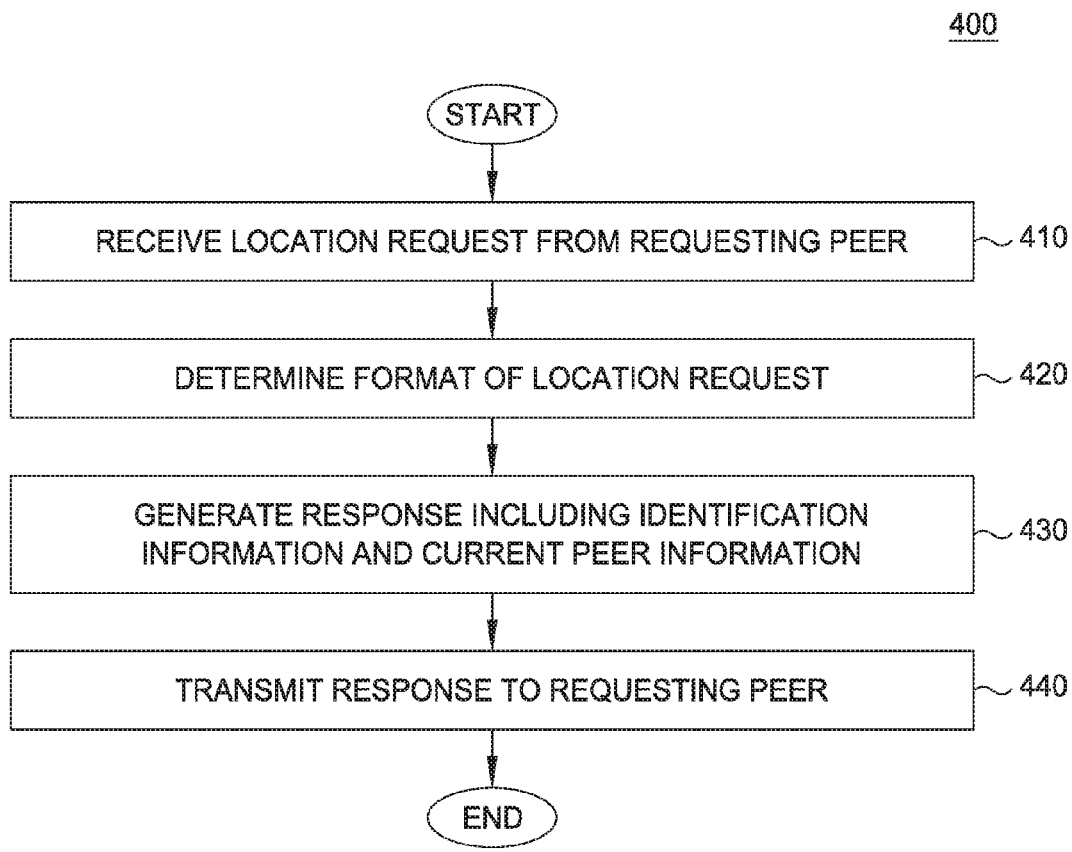
FIG. 4 is a flow chart illustrating a method to respond to positioning requests, according to one embodiment.

FIG. 4 is a flow chart illustrating a method 400 to respond to positioning requests, according to one embodiment. In one embodiment, an instance of the location application 123 executing on a peer mobile device 120 may perform the method 400 responsive to receiving a request generated at block 310. As shown, the method begins at block 410, where the location application 123 receives a location request from a requesting peer device 120. At block 420, the location application 123 may determine a format of the location request. In at least one embodiment, the location application 123 may determine a format of the location request based on the communications medium by which the request was received. At block 430, the location application 123 may generate a response including attributes of the responding device and/or vehicle. The response may include location information (which may include GPS coordinates and/or determined fine-grained location information such as current lane of travel), a rate of speed of the vehicle, and the like. The response may further include information related to any other peer mobile devices and/or vehicles known to the responding vehicle. At block 440, the location application 123 may transmit the response to the requesting peer.

Figure 5:
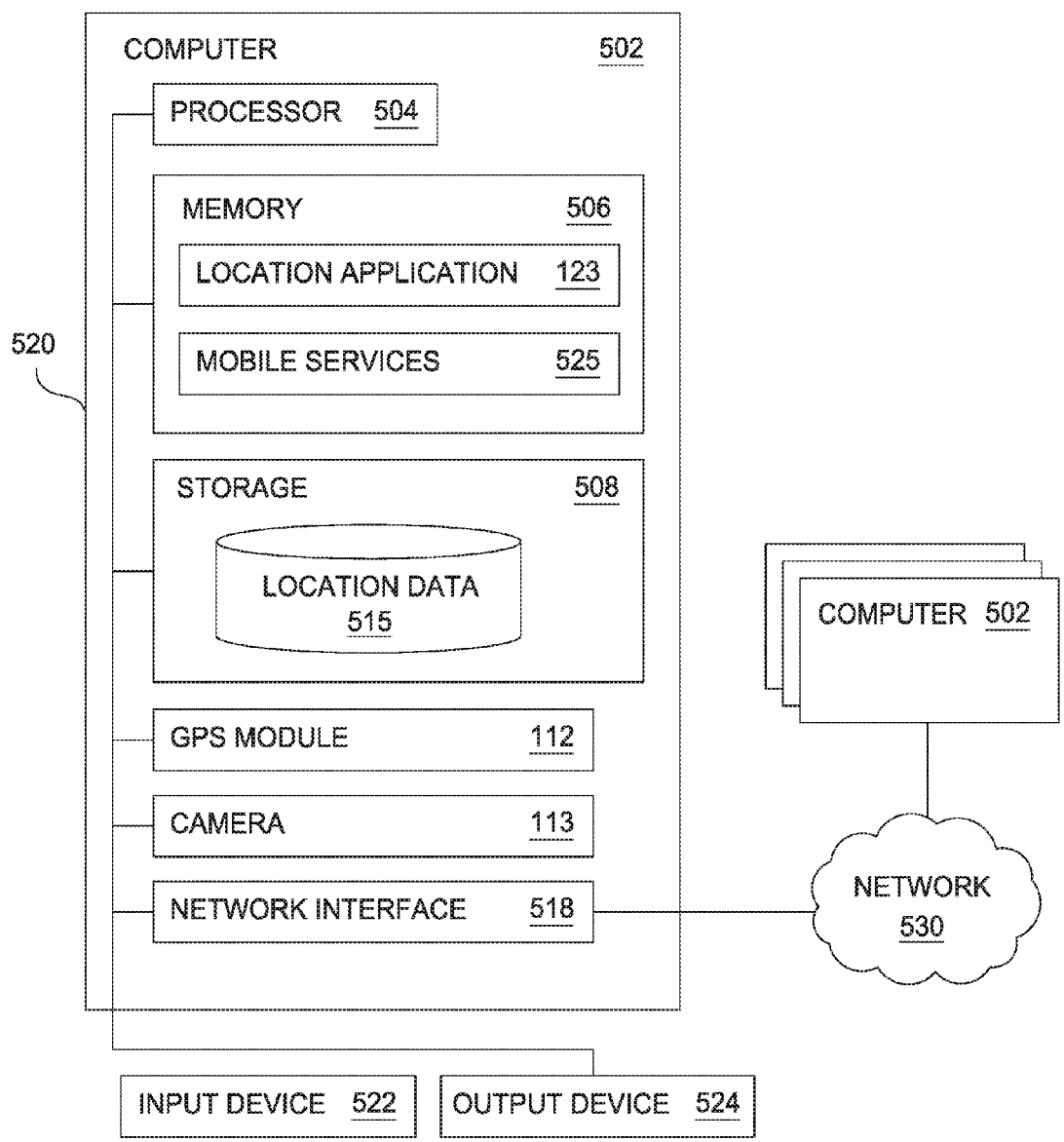
FIG. 5 is a block diagram illustrating a system which provides fine grained location-based services, according to one embodiment.

FIG. 5 is a block diagram illustrating a system 500 which provides fine grained location-based services, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on. The camera 113 may be any image capture device. The GPS module 112 is used to determine coarse-grained location information using GPS satellites.

As shown, the memory 506 contains the location application 123 and the mobile services 525. The mobile services 525 include applications and other location-based services provided by mobile devices, such as navigation applications. As described above, the location application 123 is configured to determine precise location information for the computer 502 (or an associated vehicle) based on near-range communications with other computers 502. The location application 123 is configured to provide all systems, methods, apparatuses, and functionality described above. As shown, the storage 508 contains the location data 515. The location information 515 may include location information received by the location application 123 from peer computers 502. The location application 123 may leverage the location information 515 to determine the relative position of a vehicle among other vehicles traveling on a road (such as a highway, freeway, interstate, and the like). In at least one embodiment, the computer 502 is disposed in a vehicle 101.

Figure 6:
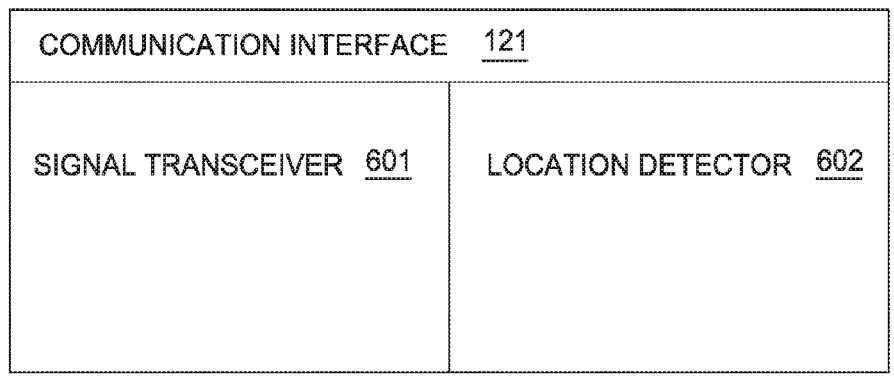
FIG. 6 illustrates components of a communication interface and a location application, according to one embodiment.
Figure 6:
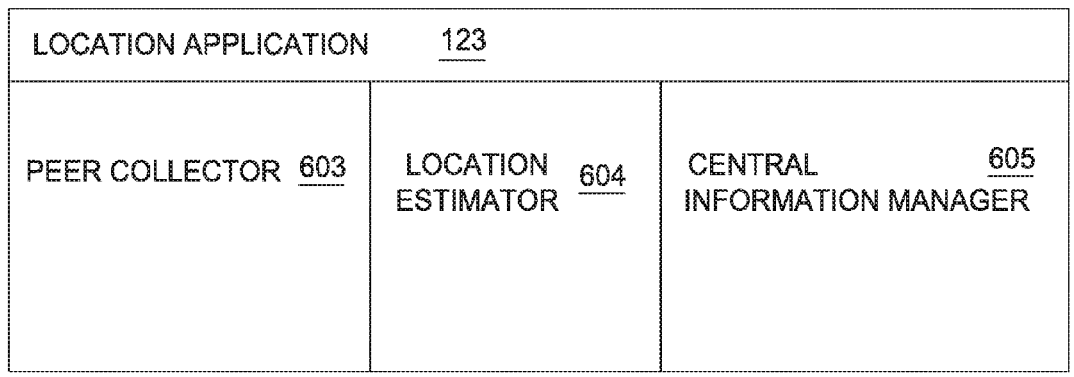

FIG. 6 illustrates components of the communication interface 121 and the location application 123, according to one embodiment. As shown, the communication interface 121 includes a signal transceiver 601 and a location detector 602. The signal transceiver 601 is a communications module that is configured to send and receive location requests and responses. Examples of the signal transceiver 601 include Bluetooth® radios, WiFi adapters, NFC modules, RFID identifiers/readers, speakers/microphones, and the like. The signal transceiver 601 may continuously transmit location requests according to a predefined timing schedule (such as every second, minute, and the like). The location detector 602 is a component that "listens" for responses to location requests received by the transceiver 601. For example, the location detector 602 may process a formatted response and forward the response to the location application 123. As another example, the location detector 602 may analyze properties of a response, such as angle of arrival, to determine whether a vehicle is located nearby, and if so, in which direction the vehicle is located.

As shown, the location application 123 includes a peer collector 603, location estimator 604, and central information manager 605. The peer collector 603 may collect the output of the location detector 602 (and any other responses received by communications interfaces of the mobile device 120). The location estimator 604 may compute the relative position (e.g., compute a fine-grained location estimate) based on one or more of the information received from the location detector 602, peer collector 603, and GPS information. The central information manager 605 may collect fine-grained location information for a given vehicle (or mobile device), and provides services to upper-layer applications such as the vehicle services 111, or the mobile services 525 executing on the mobile device 120.

Advantageously, embodiments disclosed herein provide techniques to determine precise location estimates without requiring expensive dedicated hardware. By allowing mobile devices and/or vehicles to engage in short-range communications, embodiments disclosed herein may generate an estimate of the relative position of the mobile devices and/or vehicles, and use the relative positions to determine a more precise location estimate. For example, if a vehicle traveling on a three-lane road detects vehicles to its left and its right, embodiments disclosed herein may determine that the vehicle is traveling in the center lane of the road. As such, the functioning of a computing system including a GPS module (e.g., the computer 502 and/or the mobile devices 120) is improved to provide more precise location estimates. Furthermore, the applications executing on the computer 502 and/or mobile devices 102 are improved by the more precise location estimates, exposing an enhanced array of services these applications and/or devices may provide.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   one or more computer processors; and
   a memory containing a program which when executed by the processors performs an operation comprising:
      receiving, by a first communications interface of a mobile device associated with a first vehicle, location information from a peer device associated with a second vehicle;
      determining, by the mobile device, an estimated location of the second vehicle relative to the first vehicle based on the location information received from the peer device; and
      determining, by the mobile device, that the first vehicle is located in a first lane of a road based on the estimated location of the second vehicle relative to the first vehicle.

2. The system of claim 1, the operation further comprising:
   receiving a global positioning system (GPS) location from a GPS module in the first vehicle;
   determining a precise location of the first vehicle based on the GPS location and the determination that the first vehicle is in the first lane of the road; and
   providing the precise location of the first vehicle to a service provided by one or more of the mobile device and the first vehicle.

3. The system of claim 2, wherein the service comprises one or more of: (i) a navigation service, (ii) lane-based navigation assistance, (iii) a collision avoidance service, (iv) a driving assistant, and (v) a blind-spot warning service.

4. The system of claim 1, the operation further comprising:
   receiving, by the mobile device, location information from a second peer device associated with a third vehicle; and
   determining a position of the third vehicle relative to the first vehicle based on the location information received from the second peer device, wherein the first vehicle is determined to be in the first lane of the road based on the determined positions of the second and third vehicles relative to the first vehicle.

5. The system of claim 1, wherein the first communications interface comprises one of: (i) a wireless network connection, (ii) Bluetooth® connection, (iii) a near field communication (NFC) interface, (iv) a radio frequency identifier (RFID) communication, (v) an acoustic signal, (vi) a cellular network connection, and (vii) a dedicated short range communications (DSRC) communication, wherein the position of the second vehicle relative to the first vehicle is determined based on an angle of arrival of the received location information.

6. The system of claim 1, wherein the received location information from the peer mobile device further comprises location information of a third vehicle relative to the second vehicle, wherein the determination that the first vehicle is in the first lane is further based on the location information of the third vehicle relative to the second vehicle.

7. The system of claim 1, wherein the first lane is of a plurality of lanes of the road, wherein the first vehicle is further determined to be in the first lane based on a determination that the first vehicle is adjacent to a median in the road, wherein the method further comprises:
   prior to receiving the location information from the peer device, generating, by the mobile device, a signal requesting location information from available peer devices; and
   transmitting the signal at predefined timing intervals via the first communications interface.

8. A computer program product, comprising:
   a computer-readable storage medium having computer-readable program code embodied therewith, the computer-readable program code executable by one or more computer processors to perform an operation comprising:
      receiving, by a first communications interface of a mobile device associated with a first vehicle, location information from a peer device associated with a second vehicle;
      determining, by the mobile device, an estimated location of the second vehicle relative to the first vehicle based on the location information received from the peer device; and
      determining, by the mobile device, that the first vehicle is located in a first lane of a road based on the estimated location of the second vehicle relative to the first vehicle.

9. The computer program product of claim 8, the operation further comprising:
   receiving a global positioning system (GPS) location from a GPS module in the first vehicle;
   determining a precise location of the first vehicle based on the GPS location and the determination that the first vehicle is in the first lane of the road; and
   providing the precise location of the first vehicle to a service provided by one or more of the mobile device and the first vehicle.

10. The computer program product of claim 9, wherein the service comprises one or more of: (i) a navigation service, (ii) lane-based navigation assistance, (iii) a collision avoidance service, (iv) a driving assistant, and (v) a blind-spot warning service.

11. The computer program product of claim 8, the operation further comprising:
  receiving, by the mobile device, location information from a second peer device associated with a third vehicle; and
  determining a position of the third vehicle relative to the first vehicle based on the location information received from the second peer device, wherein the first vehicle is determined to be in the first lane of the road based on the determined positions of the second and third vehicles relative to the first vehicle.

12. The computer program product of claim 8, wherein the first communications interface comprises one of: (i) a wireless network connection, (ii) Bluetooth® connection, (iii) a near field communication (NFC) interface, (iv) a radio frequency identifier (RFID) communication, (v) an acoustic signal, (vi) a cellular network connection, and (vii) a dedicated short range communications (DSRC) communication, wherein the position of the second vehicle relative to the first vehicle is determined based on an angle of arrival of the received location information, wherein the received location information from the peer mobile device further comprises location information of a third vehicle relative to the second vehicle, wherein the determination that the first vehicle is in the first lane is further based on the location information of the third vehicle relative to the second vehicle.

13. The computer program product of claim 8, wherein the first lane is of a plurality of lanes of the road, wherein the first vehicle is further determined to be in the first lane based on a determination that the first vehicle is adjacent to a median in the road, wherein the method further comprises:
  prior to receiving the location information from the peer device, generating, by the mobile device, a signal requesting location information from available peer devices; and
  transmitting the signal at predefined timing intervals via the first communications interface.

* * * * *